United States Patent Office 3,416,506
Patented Dec. 17, 1968

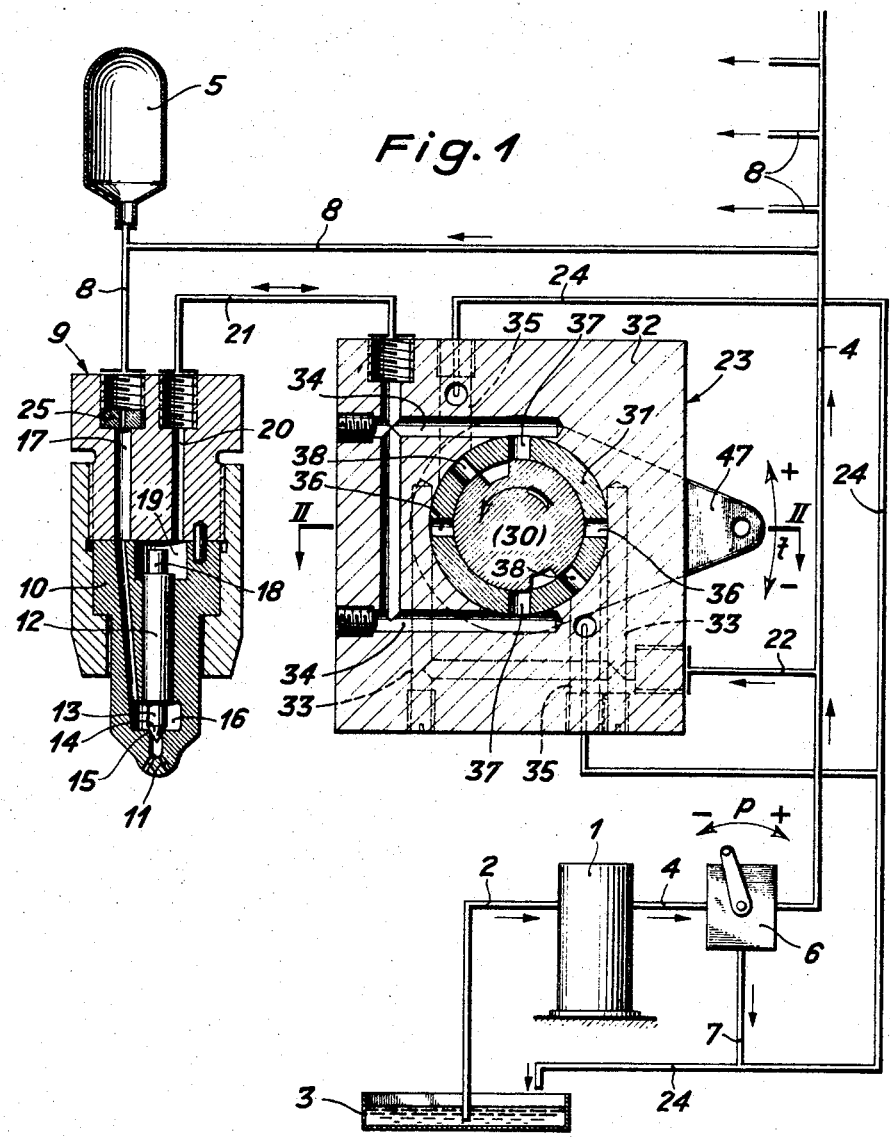

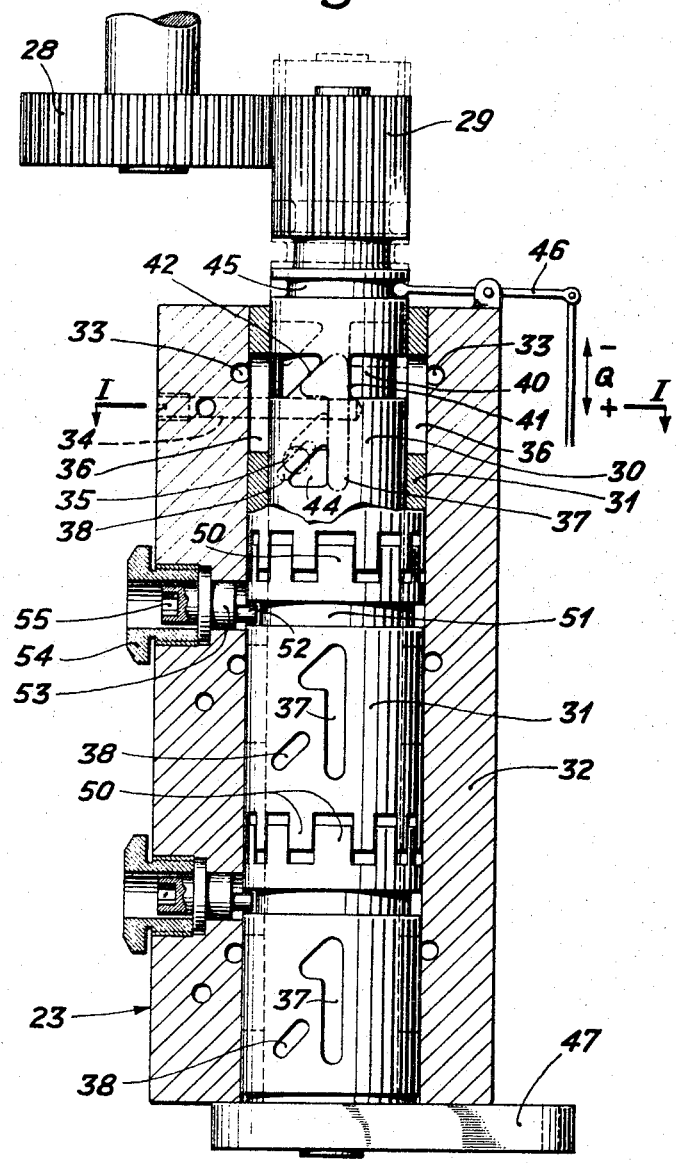

3,416,506
APPARATUS FOR INJECTION OF FUEL INTO PISTON-TYPE INTERNAL COMBUSTION ENGINES
Anton Steiger, Zurich, Switzerland, assignor to Sulzer Brothers Limited, Winterthur, Switzerland, a Swiss company
Filed Sept. 8, 1966, Ser. No. 577,899
Claims priority, application Switzerland, Sept. 14, 1965, 12,729/65
3 Claims. (Cl. 123—139)

The present invention pertains to fuel injection apparatus for piston-type internal combustion engines in which a fuel pump stores fuel under pressure in a storage space and in which fuel flows from the storage space to a fuel injection valve or injector in each cylinder of the engine. The injector comprises a housing and a needle valve or valve stem disposed in a liquid-tight guide in the housing, the needle valve bearing at one end of its travel against a valve seat to close off the passages through which fuel can flow into the cylinder. The invention provides a fuel injection system of this type in which the injector includes a hollow space at the end of the valve stem remote from the injection apertures into the cylinder, which hollow space is connected to a hydraulic pressure control system. This system includes a device by means of which the hydraulic line leading to the space above mentioned is periodically connected to a low pressure so as to permit injection of fuel into the engine cylinder.

Fuel injection systems for piston-type engines are known in which a single fuel pump delivers fuel for a plurality of cylinders of the engine into a common storage space therefor. Hydraulic conduits or "lines," as they will hereinafter be called, lead from the storage space to the individual injectors of the engine cylinders. The injectors are provided with needle valves or valve stems which control the injection of fuel. Injection into the individual cylinders is effected by lifting the valve stems at specified times and for specified durations of the engine cycle, either by mechanical or electrical or electromagnetic means. These injection systems have advantages since the instant of injection and the quantity of fuel injected and the pressure of the injected fuel can be separately and individually controlled. They have, however, a number of disadvantages also. In mechanically controlled injection systems the control system is complicated, especially if the time or phase of injection as well as the amount of the injected fuel is to be subject to adjustment. Electrical systems are likewise relatively complicated, subject to malfunction, and expensive in construction. It has also been proposed to control the operation of the injectors by mechanically controlled elements disposed in the hydraulic lines leading from the accumulator or storage space to the injectors. Such constructions are indeed possible and it is possible thereby to simplify the system by a central disposition of these control elements, but there then result long lines at high pressure leading from these control elements to the cylinders, and in large engines there result oscillations which produce supplementary or late injections and similar dynamic behavior of the injection system which is undesirable.

It is an object of the invention to provide an injection system having the advantages of the prior art systems and avoiding the disadvantages thereof. The invention makes it possible to control the injectors of a large internal combustion engine from a central control device. Since the control is not effected via the high pressure line for the fuel to be injected, dynamic oscillations which produce late injection and chattering of the valve stems do not occur. This is due to the fact that, for one thing, the control lines have much smaller cross-sections than the fuel lines and hence significantly smaller elasticity. In addition, it is possible to employ in a system according to the present invention a number of separate small fuel pressure accumulators or storage vessels instead of a large one for all cylinders. These individual storage vessels can then be disposed in the immediate vicinity of their respective injectors, with the result that the pressure drop and pressure oscillations in long fuel lines can be eliminated. Moreover the injection system according to the invention is substantially simpler than most of the prior art systems known and hence of reduced to susceptibility to malfunction.

The invention will now be further described with reference to the accompanying drawings, in which:

FIG. 1 is a schematic diagram of a fuel injection system according to the invention, in the form of a sectional view through one injector thereof and a sectional view, perpendicular to its axis of rotation, through the rotating fuel injection control device thereof; and FIG. 2 is a section taken on the line II–II in FIG. 1.

Referring to FIG. 1, a fuel pump 1 aspirates fuel from a reservoir 3 through a line 2 and delivers it into a high pressure line 4 in which is disposed a pressure controller or regulator 6. From this regulator excess fuel returns to the reservoir 3 through an overflow line 7. Branch lines 8 lead from the high pressure line 4 into separate storage vessels 5 which are allocated to the individual cylinders of the engine. The individual storage vessels 5 are permanently connected together via the lines 8 and constitute a common storage space. Each storage vessel connects via its line 8 with an injector 9 disposed in the cylinder head of an internal combustion engine not shown. The injector 9 comprises a housing 10 having injection openings 11 in the lower end thereof. A cylindrical needle or valve stem 12 is disposed in a bore in the housing, the needle having an end 13 of reduced cross-section which has a seating surface 14 of conical shape formed thereon. The surface 14 cooperates with a corresponding conical seat 15 in the housing to block off the flow of fuel to the injection openings 11. Upstream of the valve seat 15 is disposed a hollow space 16 which is connected with the high pressure line 8 through a bore 17 and thereby with the storage vessel 5 of that injector. The end of the valve 12 opposite the conical seating surface 14 likewise has a portion 18 of reduced cross-section about which is formed a hollow space 19 in the housing. The space 19 is connected through a bore 20 with a line 21 and thence through a fuel injection control device 23 to a line 22 which connects to the high pressure fuel line 4. The control device 23 makes it possible selectively to connect the lines 21 and 22 together or to shut off the line 22 and to connect the line 21 with a fuel return line 24 leading back to the fuel reservoir 3.

The pump 1 delivers fuel from the reservoir 3 into the high pressure line 4 and fills the storage vessels 5 so as to maintain upstream of injectors 9 the same pressure as that which is established at the pressure regulator 6. The excess fuel pumped is returned through the overflow line 7 into the reservoir 3. Considering any one of the vessels 5, the pressure existing therein is communicated through the line 8 and the bore 17 to the space 16 of the injector where it operates on the valve stem 12, tending to lift it. When connection is established between the lines 21 and 22 by means of the fuel control device 23, the same pressure appears in the space 19 as in the space 16 of the injector. Consequently, the same pressure is effective on both ends of the valve stem 12. Since, however, the cross-sectional area subjected to this pressure at the lower end of the stem is reduced by the area on the valve seat 15, the force exerted downwardly on the upper end of the stem prevails and pulls the stem against its seat. The injector 9 is thus closed and no injection takes place.

When, however, the fuel control device 23 breaks the connection between lines 21 and 22 and establishes a connection between the line 21 and the return line 24, the pressure in the space 19 of the injector suddenly falls. The excess pressure operative on the lower end of the valve stem lifts it and there occurs injection of fuel into the combustion chamber of the engine. The lift or stroke of the stem is determined by the clearance between the reduced portion 18 at the upper end of the valve stem and the opposing limit or wall of the space 19. To terminate injection the control device 23 re-establishes connection between the lines 21 and 22, breaking connection between the line 21 and the line 24. In this way the complete high pressure in the line 4 is again applied to the space 19 so that the hydraulic forces operative on the valve stem 12 are restored to equilibrium. By gravity, the valve stem 12 then moves downwardly and closes off the injection openings 11 by sealing of its conical surface 14 on the valve seat 15. The valve closing can be further accelerated by providing a throttling point in the bore 17 as indicated at 25. In this way upon flow of the fuel to the injection openings 11 the pressure in the line 17 falls. The pressure difference thus created between the spaces 16 and 19 effects a rapid closing of the valve stem to its seat 15.

The fuel control device 23 which effects the cyclical and successive connection together of the lines 21 and 22 on the one hand and of the lines 21 and 24 on the other hand includes a rotatable cylinder 30, hereinafter called the distributor cylinder, which is driven from the crankshaft of the engine by means of a linkage comprising the gears 28 and 29 (FIG. 2) and additional and conventional elements of structure not shown. As is evident from the twofold axially symmetric construction of the housing 32 of device 23 and of the sleeve 31 therein presently to be described (which housing and sleeve have respectively two sets of bores and slits therein 180° apart about their common axis), the drive is such that one rotation of cylinder 30 is effected for two injections into each cylinder of the engine. That is to say, in two-stroke cycle engines, the cylinder 30 will have half the rate of rotation of the engine crankshaft. The cylinder 30 is divided into separate parts along its length for each engine cylinder controlled thereby. As illustrated, the cylinder 30, and hence more generally the fuel injection control device 23 of FIGS. 1 and 2, controls the injection of fuel into three engine cylinders.

The distributor cylinder 30 is supported in an assembly of sleeves 31 which is rotationally movable through a fraction of a turn in the housing 32. One sleeve 31 is provided for each engine cylinder handled by the control device 23. FIG. 2 shows three sleeves 31 and they are coupled together for rotational motions, although they can additionally be adjusted axially with respect to each other, as will hereinafter be more fully explained. For each engine cylinder, the housing 32 is provided with two communicating bores 33 which connect to the high pressure line 22 and also with two communicating bores 34 which connect with the line 21 leading to the injection control chamber 19 of the injector 9. Additionally, the housing includes for each cylinder a pair of bores 35 which connect with the fuel return line 24.

Each sleeve 31 is provided with two longitudinal or axially extending slits 36, 180° apart, which communicate with the bores 33 throughout the limited angular motion of which the sleeve is susceptible. The sleeve further includes for each cylinder two slits 37, also 180° apart, which have approximately the shape of the Arabic number 1 and which communicate with the bores 34. Lastly, the sleeve includes for each cylinder two slits 38 which communicate with the bores 35.

The distributor cylinder 30 also possesses in its surface for each cylinder a circumferential groove 40 extending perpendicularly to its axis or rotation. The groove is however interrupted at two points 180° apart on its circumference. Each interruption of the groove defines an axially extending edge 41 and an obliquely extending edge 42. The cylinder 30 further includes for each engine cylinder a triangular cut-out 44 in its surface. The cylinder 30 is movable axially with respect to housing 32 in order to vary the quantity of fuel reaching the injectors. This axial motion is effected by engagement of a lever 46 in a circumferential groove 45 as shown in FIG. 2.

Considering the engine cylinder to which the illustrated injector 11 belongs, during operation of the engine the fuel pressure generated in the line 4 passes through the line 22 to the housing bores 33 for that engine cylinder and thence to the slits 36 of the distributor sleeve 31. From the slits 36 pressure passes into the groove 40 of the distributor cylinder 30 for that engine cylinder. If now the slits 37 of the sleeve 31 are in communication with the groove 40 of the cylinder 30, the pressure of the lines 4 and 22 will be communicated through bores 33, slits 36 and groove 40 to slits 37 and thence to bores 34 and thence to line 21 and to the injection control space 19 of the injector (FIG. 1). The injection valve accordingly remains closed. As soon however, as one of the slits 37 of the distributor sleeve is brought into communication with the adjacent slit 38 therein via the cut-out 44 in the distributor 30, there will exist communication from injector control chamber 19 to line 21 to bores 34 to that slit 37 to cut-out 44 to that slit 38 to its bore 35 and thence to the fuel return line 24. Pressure in the injection control chamber 19 of the injector will accordingly fall and the valve stem 12 will be lifted, permitting injection of fuel into the engine cylinder.

The axial position shown in FIG. 2 for the distributor cylinder 30 corresponds to zero injection time and represents the lower limit of adjustment on quantity of fuel to be injected available to the fuel control device 23. In this position, the cut-out 44 cannot effect communication between either pair of silts 37 and 38 in sleeve 31 since it comes into communication with one precisely when it loses communication with the other. If, however, the cylinder 30 is lifted from the position shown therefor in full lines in FIG. 2 towards the dash line position shown therefor, then according to the amount of this lift, there will be twice during each revolution of cylinder 30 a shorter or longer time period during which the cut-out 44 effects communication between two adjacent slits 37 and 38. This defines the duration of injection. During the time when communication exists between one pair of adjacent slits 37 and 38, there will be no communication between either of the slits 37 and the groove 40 as is apparent for one of the slits 37 from the upper portion of FIG. 2. That is, during the time, long or short according to the axial position of cylinder 30, that its cut-out 44 connects two adjacent slits 37 and 38 of the sleeve and therefore lines 21 and 24, slits 37 and hence bore 34 and line 21 are cut off from the high pressure line 4. This is effected by the interruptions of groove 40 on the cylinder which block off the slits 37 from groove 40 and hence from slits 36 and bores 33. Hence there is no back flow of fuel from the storage vessel 5 through line 8 into the fuel return line, and the only loss of pressure in the vessel 5 is that due to flow of fuel into the engine cylinder.

For the circumferential shifting of the sleeve 31 it is provided with a lever 47 (FIG. 1). By operation thereof, there can be effected within limits a shifting of the injection times of the injectors within the engine cycle.

In a multi-cylinder internal combustion engine each of the cylinders and more particularly each of the injectors requires for itself the conduit system of the fuel injection control device shown in FIG. 1. A single control device 23 can however function for several cylinders, the distributor cylinder 30 being then provided with cut-outs 40 and 44 for each of the cylinders. The sleeve 31 will however advantageously be constructed separately for each cylinder. The adjacent sleeves will be so connected together that although they can be moved together circumferentially by means of the lever 47 they will nevertheless be susceptible of individual axial adjustments. Thus as seen in FIG. 2 the three sleeves shown are coupled together for rotation by means of teeth 50 at their axial ends. Additionally, each of the sleeves 31 is provided with a shallow circumferential groove 51 into which engages an eccentric pin 52 of a cylindrical insert 53 journaled in the housing with the help of a hollow screw 54. The insert 53 may be adjusted in angular position by means of a hexagonal wrench receiving part 55.

For relative adjustment of the quantity of fuel injected into the individual cylinders, by adjustment of the position of the slits in their respective sleeves 31 with respect to their cut-outs in the cylinder 30, each of the sleeves 31 can be individually axially adjusted with respect to the housing 32 by means of the insert 53. The correct position once found is maintained by tightening the screw 54. The adjustment of the quantity of fuel injected during the operation of the engine is then effected by axial motion of the body 30, at lever 46 (FIG. 2).

The control conduit 22 does not have to be connected to the high pressure line 8 of the pump 1, but can rather be connected to any desired or available source of hydraulic medium under pressure, the pressure of which is at least as great as that in the line 8.

It will thus be seen that the invention provides fuel injection apparatus for a piston-type internal combustion engine comprising a fuel storage vessel 3, a fuel pump 1 having an outlet 4 connected to that storage vessel, and a fuel injector 9 having a housing 10 and a valve stem 12 movable within that housing between an upper or injector-opening position and a lower or injector-closing position. The housing has separate spaces 16 and 19 formed therein to which the ends of the stem 12 are exposed, the space 16 constituting a first of those spaces which communicates, when the valve stem is in injector-opening position, with a fuel injection aperture 11 through the housing. The apparatus of the invention further comprises a first conduit means 8 connecting the vessel 5 to that first space 16, a second conduit means 21 connecting to the second space 19, and means 23 to connect the second conduit means 21 cyclically and successively to a source of high pressure at 22 and 44 at least as high as the output pressure of the pump and a source of lower pressure at the fuel return line 24.

In that illustrated embodiment, the means 23 comprise the housing 32 having at bores 34 a connection to the second conduit means 21, having at bores 33 a connection to the source 22 of high pressure, and having at bores 35 a connection to the source 24 of lower pressure. The means 23 further comprise in that embodiment the circumferentially shiftable sleeve 31 having ports 36, 37 and 38 therein and the axially adjustable cylinder 30 which is coupled for rotation to the engine crankshaft, the cylinder 30 having formed therein a flow control cut-out or channel 44 of circumferntial extent varying axially of the cylinder.

In a presently preferred embodiment of the invention the source of high pressure is constituted by the outlet of said pump 1 itself. Further, the cross-section of the valve stem 12 exposed to the first chamber 16 with the valve stem in injector-closing position is preferably smaller, as is shown in the drawings, than the cross-section of valve stem exposed to the second chamber 19. Desirably, a constriction 25 is provided in the first conduit means 8 between the storage vessel 5 and the first chamber 16.

In this illustrated embodiment the groove 45 and lever 46 constitutes means for shifting the cylinder 30 axially of its sleeve 31 to vary the quantity of fuel injected. In that embodiment moreover, plural such sleeves 31 are provided for separate cylinders of an engine, the sleeves being supported coaxially together in the housing and being separately adjustable axially with respect to each other by means of the eccentric pins 52.

While the invention has been described herein in terms of a presently preferred embodiment thereof, the invention itself is not limited thereto but rather comprises all modifications of and departures from the illustrated embodiment properly falling within the spirit and scope of the appended claims.

I claim:

1. Fuel injection apparatus for a piston-type internal combustion engine, said apparatus comprising a fuel storage vessel, a fuel pump having an outlet connected to said storage vessel, and a fuel injector having a housing and a valve stem movable within said housing between injector-opening and injector-closing positions, said housing having separate spaces formed therein to which the ends of said stems are exposed, a first of said spaces communicating, when said valve stem is in injector-opening position, with a fuel injection aperture through said housing, said apparatus further comprising first conduit means connecting said vessel to said first space, second conduit means connecting to said second space, and means to connect said second conduit means cyclically and successively to a source of high pressure at least as high as the pressure in said outlet and to a source of lower pressure, said last-named means including an axially shiftable cylinder coupled for rotation to the engine crankshaft and disposed within a housing having a connection to said second conduit means, a connection to said source of lower pressure and a plurality of ported sleeves surrounding said cylinder, said sleeves being supported coaxially for rotation together and being circumferentially shiftable through a fraction of a turn, said apparatus further including means for adjusting the axial positions of said sleeves one with respect to another.

2. Fuel injection control apparatus comprising a housing having an input bore, an output bore and a fuel return bore, all communicating with a cavity in said housing, said apparatus further comprising a sleeve within the cavity and a cylinder rotatable within the sleeve, the sleeve having first, second and third ports therein positioned to be alignable respectively with the input, output and fuel return bores in the housing, the cylinder having two cut-outs formed therein, one positioned to permit communication, at least once per rotation of the cylinder, between the first and second ports of the sleeve and thereby between the input and output bores of the housing, the other of said cut-outs being positioned to permit, at least once per revolution of the cylinder, communication between the second and third ports of the sleeve and thereby between the output and fuel return bores of the housing, said one cut-out being positioned to close off communication between said first and second ports when said second cut-out provides communication between said second and third ports, said apparatus further comprising means to effect relative axial motion of the cylinder and sleeve.

3. Fuel injection control apparatus according to claim 2 wherein said cavity is cylindrical in shape, wherein each of said bores includes two passages communicating with the cavity at points 180° apart about the axis of the cavity, wherein said sleeve includes two sets of first, second and third ports 180° apart about the axis of the sleeve, and wherein the cylinder includes two sets of two cut-outs disposed 180° apart about the axis of the cylinder.

References Cited

UNITED STATES PATENTS

| | | | |
|---|---|---|---|
| 2,291,939 | 8/1942 | Amery | 123—139.11 |
| 2,347,363 | 4/1944 | Palumbo | 123—139.15 |
| 3,187,733 | 6/1965 | Heintz | 123—139.14 |

LAURENCE M. GOODRIDGE, *Primary Examiner.*

U.S. Cl. X.R.

123—140; 103—51